Aug. 25, 1959     E. C. KIEKHAEFER     2,901,075
CENTRIFUGAL CLUTCH

Filed Sept. 14, 1953     2 Sheets-Sheet 1

INVENTOR.
ELMER C. KIEKHAEFER
BY
ATTORNEYS

Aug. 25, 1959 E. C. KIEKHAEFER 2,901,075
CENTRIFUGAL CLUTCH
Filed Sept. 14, 1953 2 Sheets-Sheet 2
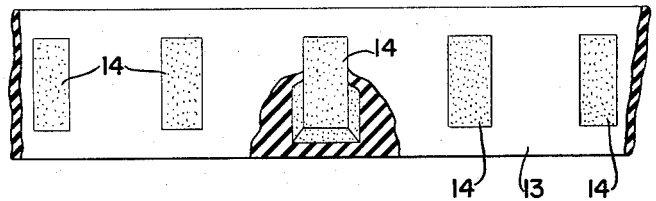
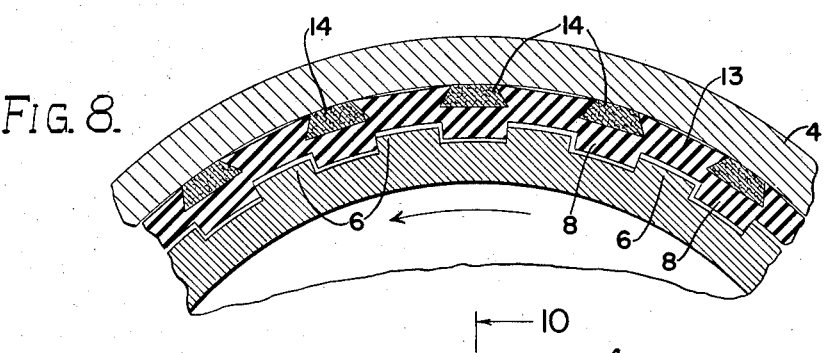
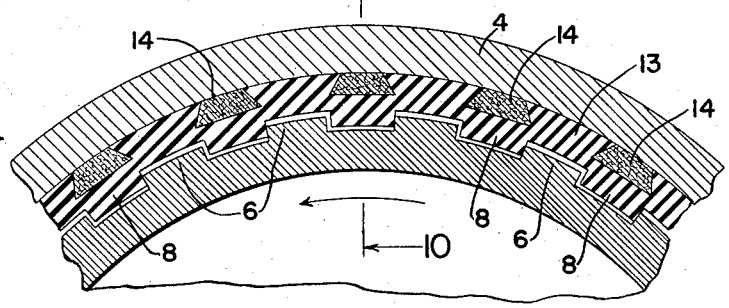
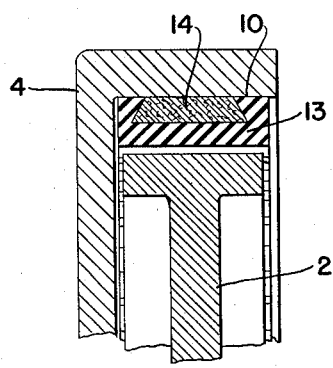
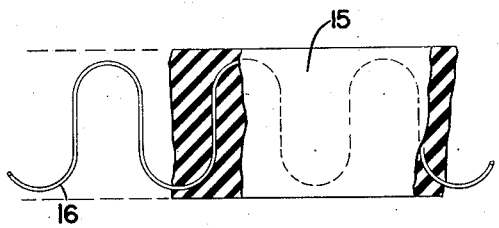
INVENTOR.
ELMER C. KIEKHAEFER
BY
ATTORNEYS

2,901,075
CENTRIFUGAL CLUTCH

Elmer C. Kiekhaefer, Cedarburg, Wis.

Application September 14, 1953, Serial No. 379,879

2 Claims. (Cl. 192—105)

This invention relates to centrifugal clutches and particularly to the clutch element which provides the engagement and disengagement of the respective members of the clutch to effect the rotation of the shaft to be driven.

The invention provides a clutch element comprising a single band of flexible material which fits the teeth of the driving member and which, with rotation, is expanded by centrifugal force into radial engagement with the inner face of the outer drum member. The outer face of the clutch element or band is provided with wear-resistant material embedded within the band to protect the band against abrasion and wear and the resilience of the band allows compression of portions thereof in advance of each tooth of the driving member to provide a degree of self-energized clutch engagement.

An object of the invention is to increase the capacity and service of a centrifugal clutch subject to adverse conditions of operation and continuous slippage.

Another object is to provide means which will accommodate the flexing and lengthwise dimensional changes necessary to allow the band to expand and contract naturally into and out of engagement with the driven member.

Another object of the invention is to provide friction means which will engage the driven member and protect the material of the band against wear.

The drawings furnished herewith illustrate the best mode of carrying out the invention as presently contemplated and set forth hereinafter.

In the drawings:

Fig. 7 is a plan view of the alternate embodiment of the invention with a part of the band broken away;

Fig. 8 is a sectional view showing a band as carried between the driven and driving members of the clutch and showing the operation of the frictional elments upon engagement with the driven clutch drum;

Fig. 9 is a view similar to Fig. 8 showing the clutch band in full engagement with the drum;

Fig. 10 is a transverse section taken on line 10—10 of Fig. 9; and

Fig. 11 is a partially sectioned portion of the clutch band having a spring element providing improved operation over the conventional garter spring.

Figure 4:
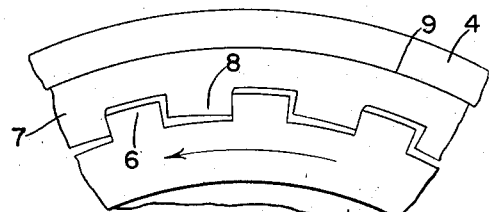
Fig. 4 is an enlarged view similar to Fig. 3 showing the deflection of the teeth of the clutch band by the torque load.
Figure 1:
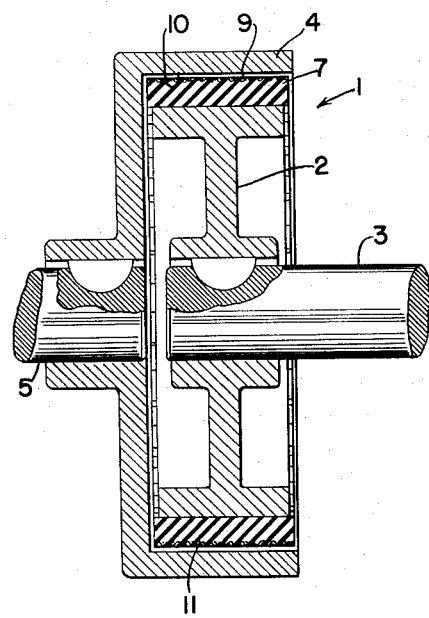
Figure 1 is a longitudinal section through a clutch unit showing the band in section and disengaged.
Figure 2:
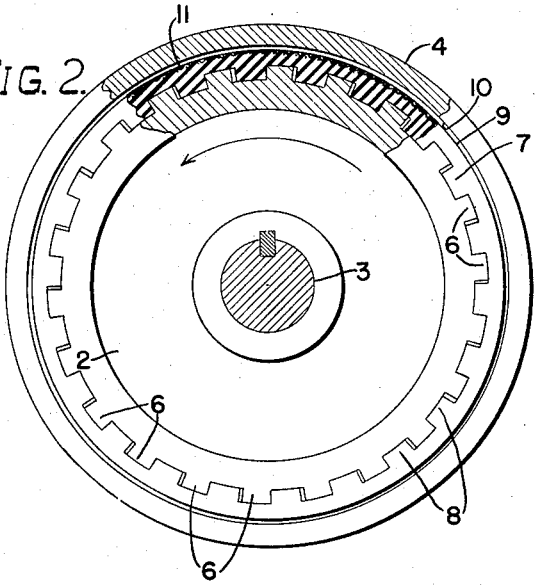
Fig. 2 is an end elevation of the clutch unit shown in Figure 1 with part of the clutch broken away and sectioned.
Figure 5:
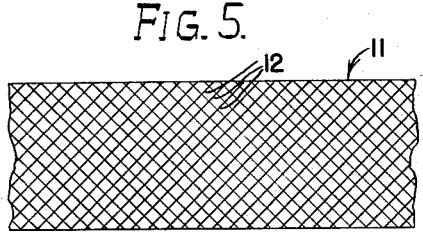
Fig. 5 is a diagrammatic illustration showing the fabric of the clutch band in the normal position as in Fig. 2.
Figure 6:
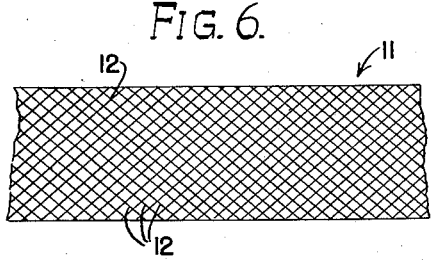
Fig. 6 is a view similar to Fig. 5 showing the band in expanded position.
Figure 3:
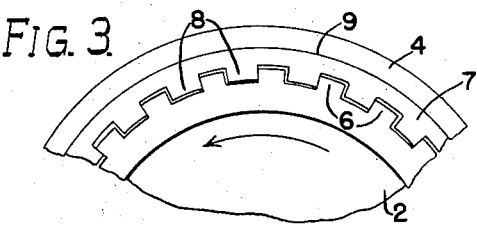
Fig. 3 is a partial view similar to Fig. 2 showing the clutch band upon engagement with the driven drum member.

The clutch unit 1 shown in the drawings comprises the drive wheel 2 which is mounted on the drive shaft 3 within the drum 4. Drum 4 is fixed on the driven shaft 5 which is mounted in substantial alignment with the axis of shaft 3.

The outer periphery of wheel 2 is provided with a series of spaced projections or teeth 6 which extend the width of the wheel. The elastic clutch band 7 has a generally smooth outer surface and an inner surface having a series of corresponding projections or teeth 8 which extend across the inner face of the band and fit between the projections or teeth 6 of wheel 2. The clutch band 7 is mounted on wheel 2 within drum 4 so that in the normal position the outer surface 9 of band 7 is spaced from and free of contact with the inner face 10 of drum 4. The band 7 is of flexible elastic material so that when the drive wheel 2 and shaft 3 rotate at a given speed, centrifugal force will cause band 7 to expand into engagement with the inner surface 10 of drum 4. Teeth 6 of wheel 2 and the teeth 8 of band 7 remain in engaged relation and their faces may be angularly disposed to provide the desired tangential and radial components of thrust to drive the drum and effect the rotation of shaft 5.

The outer face of band 7 includes a layer of fabric 11 which is woven of various suitable materials capable of withstanding the abrasive action and heat developed by repeated engagement with the surface 10 of drum 4. The strands 12 of fabric 11 extend diagonally across the face of the band 7 so that the fabric will allow the band to expand with an increasing peripheral dimension for engagement with drum 4. The slight change in the width of the fabric which occurs corresponds to the same change which occurs in band 7 when the same expands into engagement with drum 4.

In the embodiment of the invention shown in Figs. 7 through 11, the band 13 includes the clutch elements 14 which comprise rectangular pieces of friction material having chamfered sides whereby each element is suitably embedded and secured in the body of the band with one face exposed outwardly to engage surface 10 of drum 4. Each element 14 is preferably also bonded to the material of the band 13 which may be of elastic material similar to that of band 7.

Each element 14 is comprised of sintered carbon or other suitable material usually having a density substantially greater than that of the material of band 13. In initial driving engagement of band 13 with surface 10 of drum 4, the heavier elements 14 tend to pull the band radially outward while the natural resilience of the band tends to hold the band material between the elements under tension and from engagement with the drum. During the period of this condition, elements 14 serve to protect the material of band 13 against abrasion particularly in the initial period of clutch engagement while wheel 2 is bringing drum 4 up to speed. After drum 4 has reached a given speed and wheel 2 may have reached a similar speed, the band 13 expands into engagement with surface 9 of drum 4.

As the speed of wheel 2 increases and the centrifugal force acting on band 7 causes the portion of the band between elements 14 to be expanded into engagement with the face 10 of drum 4, the positive driving engagement of the band with the drum is effected.

Elements 14 serve to protect band 13 against wear and heat particularly during the period that the wheel is turning at a speed greater than that of drum 4.

In the embodiment of the invention shown in Fig. 11, the band 15 is similar to bands 7 and 13, for mounting on wheel 2 and driving drum 4. The wire 16, which is preferably continuous, may extend within any of these bands 7, 13 or 15 and around the wheel and is of a weight which provides substantial centrifugal effect and increases the clutching capacity of the band. The configuration of the wire allows the band to expand for engagement with drum 4. Wire 16 comprises a series of opposite and alternately formed loops which extend entirely within the band to provide a configuration which allows the band to be expanded radially upon rotation.

Each band includes a series of teeth which are deflected as shown in Fig. 4 upon subjection to a shearing stress which causes localized compression of the rubber in advance of each tooth 6 of wheel 2. The tendency of the rubber to being squeezed between the outer ends of teeth 6 and the face 10 of drum 4 by reason thereof is utilized according to the invention to provide the self-energizing of the clutch wherein the torque load effects a degree of the frictional engagement of the clutch band and drum.

Various modes of carrying out the invention are contemplated as within the scope of the following claims particularly pointing out and distinctly claiming the subject matter which is regarded as the invention.

I claim:

1. In a centrifugal clutch, a driven drum, a driving wheel having a series of projecting teeth about the periphery thereof, a molded clutch band having a series of corresponding teeth in engagement with the teeth on said wheel and having a natural elasticity which retains the band on the wheel during rotation of the wheel up to and within a given speed, the outer face of said band and the inner face of said drum having a nominal clearance which allows the wheel to rotate freely without driving the drum at said speeds, the elasticity of the band when the wheel exceeds such speed allowing the band to be expanded by centrifugal force into engagement with the inner surface of the drum whereby the rotation of the wheel effects the rotation of the drum upon the frictional engagement of the outer surface of the band with the inner surface of the drum, and a layer of fabric woven diagonally with respect to the outer periphery of the band and integrally bonded to the outer face of the band and engageable with said drum, said fabric being expansible to accommodate the increased peripheral dimension of the band during such engagement.

2. In a centrifugal clutch, a driven drum, a driving wheel having a series of projecting teeth about the periphery thereof, said driving wheel being adapted to be mounted within the drum on an axis concentric therewith, a cylindrical clutch band mounted on said wheel and having a series of corresponding teeth engageable with the teeth of said wheel, said band being of molded elastic material having an annular wire strand corrugated in the direction of the width of the band embedded therein and having a wear-resistant abrasion material provided on the outer periphery thereof and being expandable to an increased peripheral dimension to engage the inner face of the drum by centrifugal force, said corrugated wire strand being expandable with said band and the weight thereof providing substantial centrifugal effect to increase the clutching capacity of the band.

References Cited in the file of this patent

UNITED STATES PATENTS

| | | |
|---|---|---|
| 2,283,325 | Fawick | May 19, 1942 |
| 2,367,048 | Pentz | Jan. 9, 1945 |
| 2,728,700 | Gatke | Dec. 27, 1955 |

FOREIGN PATENTS

| | | |
|---|---|---|
| 146,709 | Great Britain | July 15, 1920 |
| 348,823 | Italy | June 1, 1937 |